(12) United States Patent
Ferretti et al.

(10) Patent No.: US 8,587,471 B2
(45) Date of Patent: Nov. 19, 2013

(54) PROCESS FOR IDENTIFYING STATISTICALLY HOMOGENEOUS PIXELS IN SAR IMAGES ACQUIRED ON THE SAME AREA

(75) Inventors: Alessandro Ferretti, Milan (IT); Roberto Locatelli, Seveso (IT)

(73) Assignee: Tele-Rilevamento Europa—T.R.E. s.r.l., Milan (IT)

( * ) Notice: Subject to any disclaimer, the term of this patent is extended or adjusted under 35 U.S.C. 154(b) by 123 days.

(21) Appl. No.: 13/259,363

(22) PCT Filed: Mar. 26, 2010

(86) PCT No.: PCT/EP2010/054016
§ 371 (c)(1),
(2), (4) Date: Sep. 23, 2011

(87) PCT Pub. No.: WO2010/112426
PCT Pub. Date: Oct. 7, 2010

(65) Prior Publication Data
US 2012/0013501 A1    Jan. 19, 2012

(30) Foreign Application Priority Data
Apr. 3, 2009 (IT) .............................. MI2009A0535

(51) Int. Cl.
*G01S 13/00* (2006.01)
*G06K 9/62* (2006.01)
*G06K 9/76* (2006.01)
*G06K 9/40* (2006.01)

(52) U.S. Cl.
USPC ...... 342/25 R; 342/25 A; 342/25 F; 382/209; 382/210; 382/261

(58) Field of Classification Search
USPC ....... 342/25 R, 25 A, 25 B, 25 C, 25 D, 25 E, 342/25 F; 382/181, 209, 210, 217, 218, 254, 382/260, 261
See application file for complete search history.

(56) References Cited

U.S. PATENT DOCUMENTS 4,219,811 A * 8/1980 Herman et al. ............. 342/25 E
4,851,848 A * 7/1989 Wehner ...................... 342/25 D
(Continued)

FOREIGN PATENT DOCUMENTS

EP    1 387 317 A1    2/2004

OTHER PUBLICATIONS

Mihai Ciuc et al., "Adaptive-neighborhood speckle removal in multitemporal synthetic aperture radar images", Applied Optics, OSA, Optical Society of America, Washington, DC, vol. 40, No. 32, Nov. 10, 2001, pp. 5954-5966.*

(Continued)

*Primary Examiner* — Jack W Keith
*Assistant Examiner* — Peter Bythrow
(74) *Attorney, Agent, or Firm* — Wenderoth, Lind & Ponack, L.L.P.

(57) ABSTRACT

A process includes acquiring radar images on the same area, calculating a vector of n amplitude or intensity values relating to a sample pixel in the n images available, identifying the vector as a sample vector, and defining an estimation window for the sample pixel for identifying a set of pixels around the sample pixel. Additionally, calculating vectors of N amplitude or intensity values for each pixel contained in the estimation window, comparing each vector with the sample vector, identifying pixels associated with the vectors that have passed a statistical test and identifying pixels associated with the vectors that have not passed the statistical test, eliminating the pixels contained in the estimation window that are not connected to the sample pixel, and identifying the set of pixels that are statistically homogeneous with the sample pixel.

12 Claims, 7 Drawing Sheets

(56) References Cited

U.S. PATENT DOCUMENTS

| | | | | |
|---|---|---|---|---|
| 4,963,877 | A | * | 10/1990 | Wood et al. .................. 342/25 A |
| 5,061,931 | A | * | 10/1991 | Farina et al. ................. 342/25 F |
| 6,137,437 | A | * | 10/2000 | Lin et al. ........................ 342/104 |
| 6,563,451 | B1 | * | 5/2003 | Krikorian et al. ............ 342/25 R |
| 6,603,424 | B1 | * | 8/2003 | Abatzoglou ................. 342/25 R |
| 7,109,911 | B1 | * | 9/2006 | Cataldo ....................... 342/25 R |
| 7,298,922 | B1 | * | 11/2007 | Lindgren et al. .............. 382/294 |
| 7,492,947 | B2 | * | 2/2009 | Nanbu .......................... 382/209 |
| 7,974,473 | B2 | * | 7/2011 | Nanbu .......................... 382/209 |
| 2004/0066978 | A1 | * | 4/2004 | Nanbu .......................... 382/261 |
| 2005/0047663 | A1 | * | 3/2005 | Keenan et al. ................. 382/225 |
| 2009/0041370 | A1 | * | 2/2009 | Wu et al. ....................... 382/260 |
| 2009/0080724 | A1 | * | 3/2009 | Nanbu .......................... 382/128 |
| 2012/0013501 | A1 | * | 1/2012 | Ferretti et al. .............. 342/25 A |

OTHER PUBLICATIONS

Stephane Marchand-Maillet, Yazid M. Sharaiha, "Binary Digital Image Processing: A Discrete Approach", 2000, p. 173-198, available at http://www.sciencedirect.com/science/book/9780124705050.*

International Search Report and Written Opinion of the International Searching Authority issued May 12, 2010 in corresponding International Application No. PCT/EP2010/054016.

Mihai Ciuc et al., "Adaptive-neighborhood speckle removal in multitemporal synthetic aperture radar images", Applied Optics, OSA, Optical Society of America, Washington, DC, vol. 40, No. 32, Nov. 10, 2001, pp. 5954-5966, XP002256732, ISSN: 0003-6935.

Fátima N. S. Medeiros et al., "Combined Use of Map Estimation and K-Means Classifier for Speckle Noise Filtering in SAR Images", Image Analysis and Interpretation, IEEE Southwest Symposium on Tucson, AZ, USA, Apr. 5, 1998, pp. 250-255, XP010274978, ISBN: 978-0-7803-4876-9.

Jong-Sen Lee, "Digital Image Smoothing and the Sigma Filter", Computer Vision, Graphics, and Image Processing, Elsevier Science, [Online], vol. 24, Jan. 1, 1983, pp. 255-269, XP002511283, ISSN: 0734-189X.

* cited by examiner

Fig. 7a
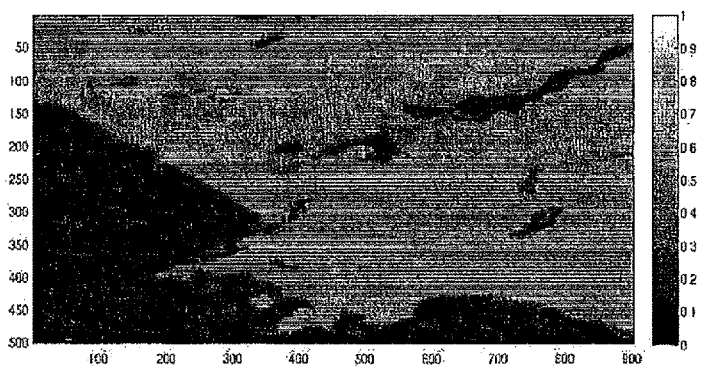
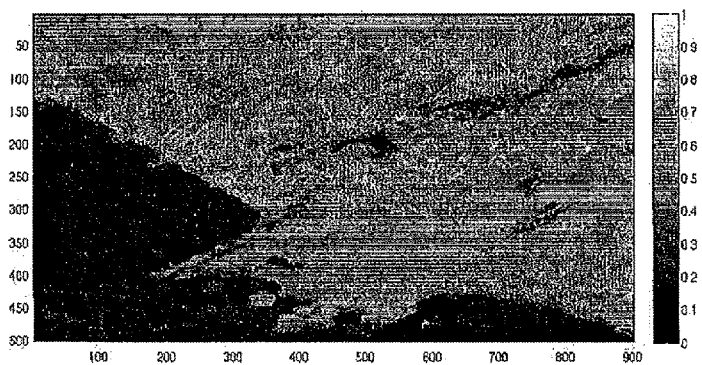
Fig. 7b

PROCESS FOR IDENTIFYING STATISTICALLY HOMOGENEOUS PIXELS IN SAR IMAGES ACQUIRED ON THE SAME AREA

SUMMARY OF INVENTION

BACKGROUND OF INVENTION

The present invention relates to a process for identifying statistically homogeneous pixels in SAR images acquired on the same area.

As is known, a synthetic aperture radar (or SAR) system produces a two-dimensional image. One dimension of the image is called the range and is the measurement of the distance in a view line from the radar of the object that is being illuminated. The other dimension is called the azimuth and is perpendicular to the range.

The SAR radar operates at a frequency that is generally comprised between 400 Mhz and 10 Ghz, and is usually installed on aeroplanes or satellite platforms orbiting at a height of between 250 and 800 Km. The antenna of the radar points to earth orthogonally to the direction of motion of the platform (aeroplane or satellite) at an angle known as the "offnadir" angle comprised between 20 and 80 degrees compared with the nadir direction, i.e. perpendicularly to the earth.

With this system images of the earth's surface can be generated with a spatial resolution of a few meters, thus synthesising (hence the name of the sensor) in the direction of the azimuth an antenna of much greater dimensions than real dimensions by means of appropriate algorithms that are well known in the literature.

The most important feature of the SAR is that it is a consistent sensor and therefore the images are matrices of complex numbers the amplitude values of which are linked to the power that is backscattered by the illuminated objects (i.e. to the radar cross section thereof), whilst the step is determined by the nature of the target and the distance of the target from the radar. Owing to the possibility of obtaining images regardless of sunlight conditions and cloud cover, the SAR images are suitable for different applications; amongst these, the applications linked to the identification and classification of targets, "change detection" and interferometry applications are of primary importance. The latter are usually aimed at obtaining digital elevation models and/or the analysis of surface deformation of the terrain from sets of multitemporal SAR data.

Often, in the processes used for extracting information of interest from radar data, it is useful to group together homogenous pixels of the images that are statistically homogenous, i.e. the radar signature of which is substantially identical. Let it suffice to think of the problems connected with filtering (denoising) data: sound reduction, whether it be of amplitude or of phase, is normally conducted to the detriment of the spatial resolution of the data. In practical terms, in fact, denoising is nearly always translated into a movable average operation conducted on an estimation window around each image pixel. A similar approach is also used to estimate other parameters of interest linked, for example, to geophysical or electromagnetic properties of the illuminated targets, such as temporal consistency, the scattering matrix in polarmetric data, etc.

A general SAR image gathers data coming from targets of various natures: natural (woods, rocks, meadows, etc) or artificial (manufactured products, metal structures, motor vehicles, etc). The electromagnetic features can thus vary significantly even between adjacent pixels of a radar image. There can also be distributed targets that generate almost identical radar features of the radar signal, for an entire group of pixels, both punctiform or characterising a single pixel or at most a few other pixels connected thereto. These two types of target normally require processing that is substantially different in current applications. For example, adopting filtering techniques that prove to be useful for the first type of target (distributed) is harmful for the second (punctiform) that are typically characterised by high values of the signal-noise ratio (SNR), and where the spatial average operation conducted on adjacent pixels, characterised by lower SNRs, is counterproductive.

In view of the prior art, the object of the present invention is to provide a process for identifying statistically homogeneous pixels of SAR images acquired on the same area, i.e. characterised by similar electromagnetic properties, on which it is possible to make reliable statistical estimates, on a support selected in an adaptive manner.

According to the present invention, this object is achieved by a process for identifying statistically homogeneous pixels in images acquired on the same area by means of a synthetic aperture radar (SAR sensor) comprising the following steps:

(a) acquiring a plurality of N radar images by means of a SAR sensor on the same area with acquisition geometries that are suitable to consent the common grid resampling of data, (b) after the common grid resampling, selecting a pixel and identifying the pixel as a sample pixel, (c) calculating a vector of N amplitude or intensity values relative to the sample pixel in the N available images and identifying the vector as a sample vector, (d) defining an estimation window for the sample pixel to identify a set of pixels in the neighbourhood of the sample pixel, (e) calculating the vectors of N amplitude or intensity values for every pixel contained in the estimation window, similarly to what has been done for the sample pixel;

(f) comparing, by means of a statistical test, every vector of amplitude or intensity values of the pixels belonging to the estimation window with the sample vector to verify which of the vectors of amplitude or intensity values are generated by the same probability distribution function of the sample vector, (g) identifying those pixels associated with the vectors of amplitude or intensity values that have passed the test (f) as being pixels that are homogenous with the sample pixel and identifying as pixels that are not homogeneous with the sample pixel those pixels associated with the vectors of amplitude or intensity values that have not passed the test (f), (h) eliminating the pixels contained in the estimation window that, even if associated to vectors that have passed the test (f), yet do not result connected to the sample pixel, directly or by means of other pixels that resulted homogeneous to it, (i) identifying the pixels that are homogeneous and connected to the sample pixel as being statistically homogeneous pixels.

Owing to the present invention it is possible to implement a process for identifying statistically homogeneous pixels of SAR images acquired on the same area on which to conduct general processing, thus drastically reducing the problems generated by averages and estimates made on statistical populations of strongly inhomogeneous data that can lead to the filtering results, and more in general, the analysis being completely distorted.

In addition, the process according to the invention also enables the response of the punctiform radar targets to be preserved.

BRIEF DESCRIPTION OF THE DRAWINGS

The features and advantages of the present invention will be clear from the following detailed description of a practical embodiment thereof, illustrated by way of non-limiting example in the attached drawings, in which:

FIG. 7a shows a consistency map estimated with a conventional method, or on a non-adaptive rectangular estimation window;

FIG. 7b shows a consistency map estimated on an adaptive window, or on groups of statistically homogeneous pixels, with a process according to the process of the invention.

DETAILED DESCRIPTION OF INVENTION

Figure 1:
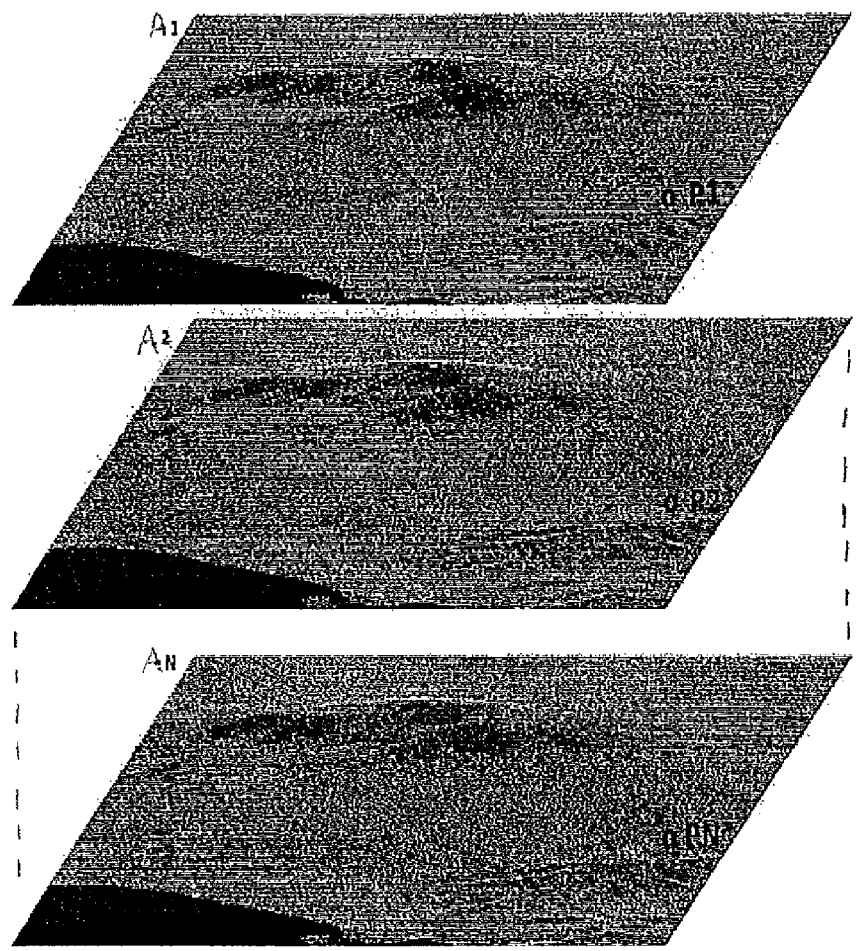
FIG. 1 shows a series of SAR images that are acquired and resampled on a common grid.

The process according to the invention works on collections (or datasets) of N radar images A1 ... AN (FIG. 1) relating to the same area, detected at different times and/or at different view angles, but such as to consent the common grid resampling of data. Downstream of the resampling, all the dataset images are made to be superimposable on one another on a common grid, such that homologous pixels in two general images of the set of data correspond to the same portion of terrain illuminated by the radar.

The values on which the process operates are the amplitude values of the signal that is acquired by the SAR relating to a certain cell of resolution pixels on the ground, namely the N amplitude values recorded at a certain pixel in the N acquisitions available on the interest area. Operating only on the amplitude values enables a smaller computational calculation to be made and enables the process to be made independent of a whole series of effects, which are well known in SAR interferometry, which alter the phase value of the signal, but which maintain the module thereof substantially unaltered, such as, for example, the atmospheric effects or the trajectory variations of the satellite. The process can also be applied to the intensity values of the images, i.e. the squared amplitude values.

The process comprises selecting a pixel as a sample pixel.

By means of said N radar images resampled on a common grid A1 ... AN (FIG. 1), for every sample pixel a vector of N amplitude values is constructed relating to the area illuminated by the radar during the course of the acquisitions. Vectors of amplitude values with N dimensions are thus obtained. The amplitude value A is calculated by the equation $A=\sqrt{Re^2+Im^2}$ where Re is the real part and Im is the imaginary part of each complex number of the pixel under examination, as the SAR images are available as matrices of complex numbers. The vector of amplitude of the sample pixel is defined as the sample vector.

Figure 2:
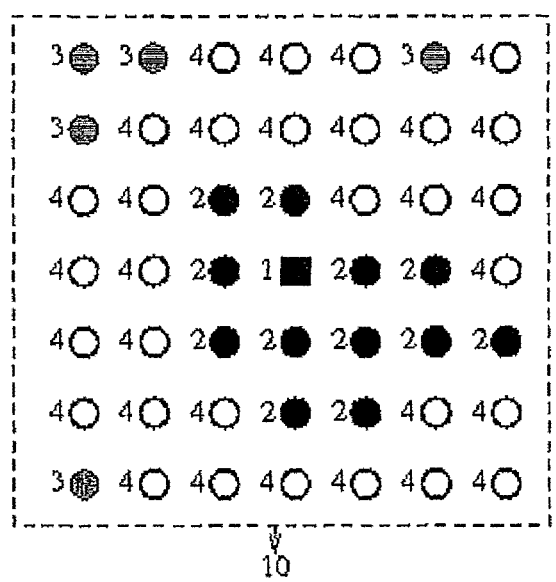
FIG. 2 show schematically an estimation window with pixels that are homogenous with the sample pixel, but are not connected to the sample pixel and pixels that are homogenous with and connected to the sample pixel.

The process according to the invention comprises (FIG. 2), for each sample pixel 1 (indicated by a black square), the definition of an area of interest 10, said estimation window, within which to seek the pixels that are statistically homogeneous to the sample pixel. The shape and dimension of the estimation window are parameters that may vary from one application to another but usually a rectangular window is selected that comprises a few hundred pixels.

For each pixel belonging to the estimation window 10 the vector of N amplitude values is calculated in the same manner as the sample vector.

The estimation window identifies a set of pixels and a set of vectors of amplitude that have the same dimension N as the sample vector and which can be compared with the sample vector in the search for a statistically homogenous behaviour. The problem is traceable to the comparison between two vectors of random variables containing the same number N of samples, about which it is desired to ascertain whether they can be considered to be two embodiments of the same distribution function or embodiments of different distribution functions.

It is necessary to conduct a test to compare each vector associated with the pixel of the estimation window 10 and the sample vector.

In order to make the procedure as generalisable as possible and in order not have to suppose that the algorithm is valid only inside a specific family of statistical distributions, the test can be of the non-parametric type. This type of comparison test is known in the prior art; one of the usable and known is the Kolmogorov-Smirnov (KS) that test, which in fact requires only the degree of desired significance to be selected, and which gives reasonable results with limited dimensions of the test vectors. Said test is disclosed in chapter 14, pages 620-628 of the book "Numerical recipes in C: the art of scientific computing" (ISBN 0-521-43108-5), 1988-1992 published by the University of Cambridge or the article of Massey, F. J. "The Kolmogorov-Smirnov Test for Goodness of Fit." Journal of the American Statistical Association, Vol. 46, No. 253, 1951, pp. 68-78.

Obviously, the fuller the dataset (i.e. the greater the number N of available images), the more reliable the results will be. The adopted test can be refined if it is desired to use a priori information on the signal statistics. The KS test has also found to be valid also in the event of less than perfect radiometric calibration of the various radar shots.

After said comparison test conducted on all the vectors of amplitude relating to the estimation window 10 has been concluded, pixels 2 and 3 (FIG. 2) will be marked as being homogenous with the sample pixel 1 (where the pixels 3 are indicated by grey circles and the pixels 2 are indicated by black circles) and the pixels 4 will be marked as not being homogenous with the sample pixel (indicated by white circles).

Subsequently, there is a step of verifying that the pixels marked as being homogenous with the sample pixel are connected thereto, so as to constitute a distributed target and not a disconnected set of object. The test of connection between each pixel marked as being homogenous in the estimation window 10 and the sample pixel is easily implementable and is anyway a test known in the prior art (see, for example, in the book "Binary digital image processing" of S. Marchand-Maillet and Y. M. Sharaiha, Academic press, 2000).

The process according to the invention thus comprises the following steps:
- acquiring a plurality of N radar images A1 ... AN by means of a SAR on the same area with similar acquisition geometries and such as to consent the common grid resampling of data,
- downstream of the resampling, selecting a pixel and identifying the pixel as a sample pixel 1,
- calculating a vector of N amplitude values relating to the sample pixel in the N images available and identifying the vector as a sample vector,
- defining an estimation window 10 (FIG. 2) for the sample pixel, for identifying a set of pixels in the neighbourhood of the sample pixel,
- calculating the vectors of N amplitude values for each other pixel contained in the estimation window, similarly to what is done for the sample pixel;
- comparing, via a statistical test, each vector of amplitude associated with the pixels belonging to the estimation window with the sample vector to ascertain which vectors of amplitude are generated by the distribution function of the sample vector,
- identifying as pixels (FIG. 2) that are homogenous with the sample pixel those pixels that are associated with the vectors of amplitude values that have passed the statistical test 2, 3 and identifying as pixels that are not homogenous with the sample pixel those pixels 4 that are associated with the vectors of amplitude values that have not passed the statistical test,
- eliminating the pixels contained in the estimation window 10 that, although they are associated with vectors that have passed the test, are not, however, connected 3 to the sample pixel 1, directly or by means of other pixels that are homogenous thereto,
- identifying the set of pixels that are homogenous with and connected to the sample pixel as pixels 2 that are statistically homogeneous with the sample pixel 1.

The set of the pixels that are statistically homogeneous with the sample pixel can be used to conduct estimates of averages or other estimates.

Each point of the image can be selected as a sample pixel and the process can thus be conducted on all the pixels of the area of interest.

Some sample pixels may not have homogeneous pixels contained in the respective estimation windows. This latter case is typical of so-called punctiform pixels, with electromagnetic behaviour that is distinctively different from that of the surrounding terrain.

In the presence of distributed pixels with an extent that is greater or the same as that of the estimation window, all the pixels will in general be similar to the sample pixel, thus enabling an estimation to be made on a high number of samples.

It is thus possible to implement a filtering strategy and/or adaptive estimation that maintains the details relating to punctiform radar pixels but also permits robust filtering of the homogenous areas of the image in a manner that is automatic and transparent to the user.

The process for identifying statistically homogeneous pixels of SAR images according to the invention is implemented by application software installed in a memory of a processing device; the latter comprises a microprocessor that converses with the memory to run said application software. The estimation window is chosen by the user.

Three different applications of the process according to the invention are disclosed below.

The process according to the invention is used to reduce the speckle noise of a SAR image. A dataset consisting of 75 multitemporal radar data acquired by the ERS-1 and ERS-2 satellites of the European Space Agency is used to create, for each pixel of the image, the set of pixels that are statistically homogenous with the process according to the invention.

Figure 3:
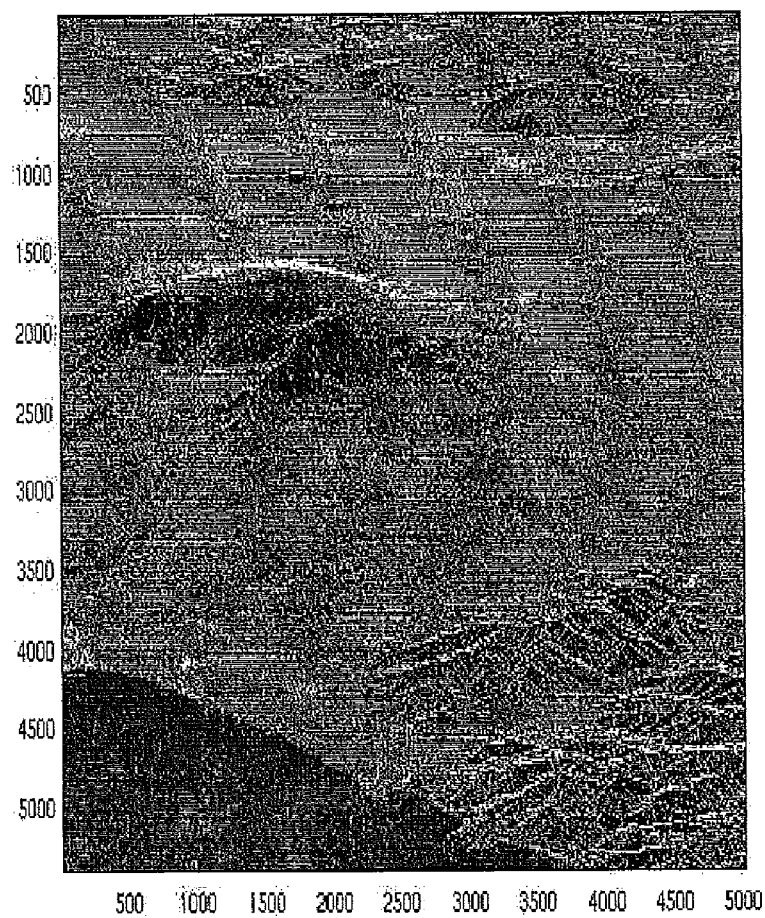
FIG. 3 shows the average reflectivity map of the area of the Etna volcano.
Figure 4:
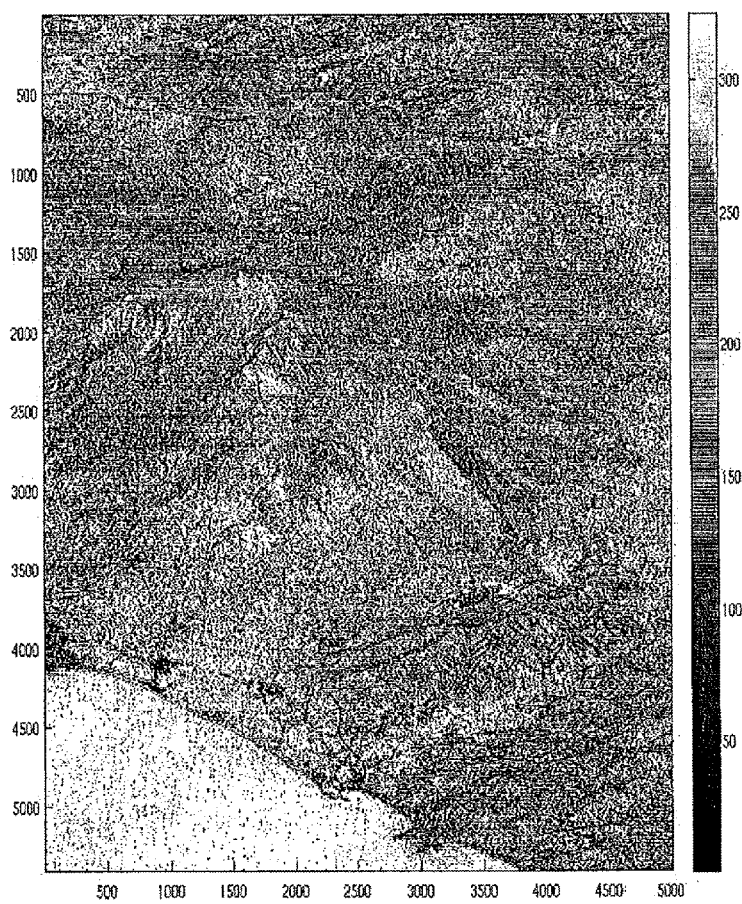
FIG. 4 shows for each pixel the number of statistically homogeneous pixels associated therewith, according to the process of the invention.
Figure 5A:
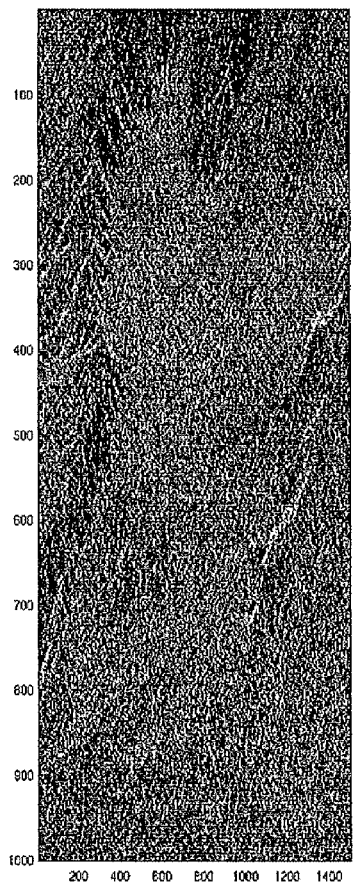
FIG. 5a shows an image before the anti-speckle filter is applied according to the process of the invention.
Figure 5B:
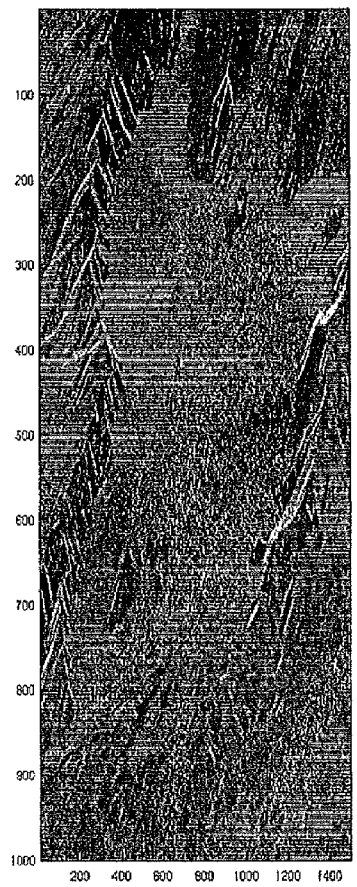
FIG. 5b shows the same image of the FIG. 5a after the application of the anti-speckle filter according to the process of the invention.

The estimation window used in this and in the subsequent examples is rectangular in shape and measures 13×25 pixels (respectively in the range and the azimuth directions): it can thus contain a maximum value of 325 homogenous pixels. In FIG. 3 for simpler interpretation of the results, the map of the average reflectivity of the area of interest is shown, i.e. the average of the amplitude values relating to the 75 multitemporal radar data acquired by the ERS-1 and ERS-2 satellites on Mount Etna; the horizontal dimension is the azimuth coordinate whilst the vertical dimension is the range coordinate. In FIG. 4 for each pixel there is shown the number of statistically homogenous elements associated therewith identified by the process, whilst FIG. 5b shows the benefits of the use of the process according to the invention as an anti-speckle filter compared with an anti-speckle filter of known type (FIG. 5a). The speckle noise corresponds to variations in the amplitude values of the signal that are also located on homogenous targets that are observed in the data obtained by the so-called consistent observation systems, such as the SAR systems. The speckle noise is reduced by means of a simple algorithm that is movable only on the amplitude values relating to the pixels that are statistically homogeneous with the current pixel. The result of the filtering conducted according to the process according to the invention is notable, such as to be able to compare the single acquisition (filtered on adaptive windows corresponding to the statistically homogeneous pixels) with the map of average reflectivity (FIG. 3), in which all 75 available images are used. This, whilst the spatial resolution of the data is maintained unaltered, does not, however make a multitemporal analysis of the reflectivity values possible but can, on the other hand, show variations over time of the RCS values originated by various phenomena such as changes in ground humidity, variations in vegetation, presence of artificial targets, etc.

The second application of the process according to the invention is the use thereof as a filtering tool of SAR interferograms.

Figure 6A:
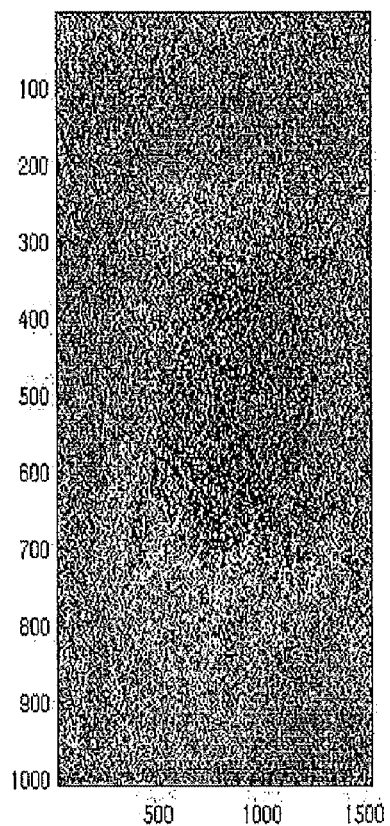
FIG. 6a shows an interferogram before the application of the filter for interferograms according to the process of the invention.
Figure 6B:
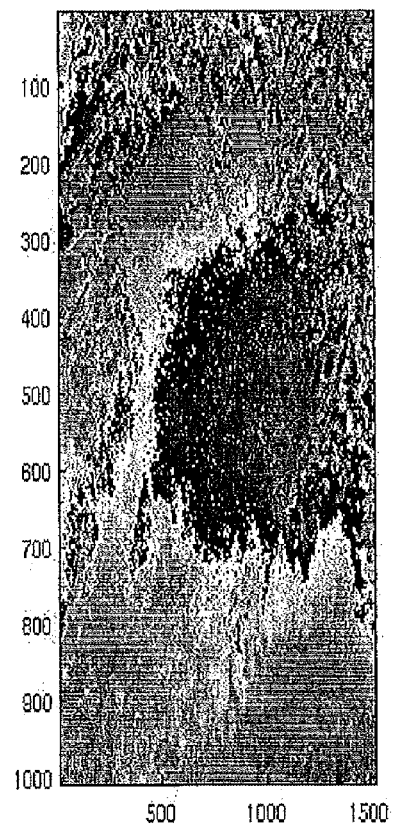
FIG. 6b shows the same image as FIG. 5a after the application of the filter for interferograms according to the process of the invention.

By using the same database of SAR images acquired by the ERS satellites of the preceding example, in FIGS. 6a and 6b there are shown the interferometric fringes of the zone of Valle del Bove, obtained by a pair of ERS images. Each 'fringe' corresponds to a motion of the terrain along the view line of a little less than 3 cm.

The same fringes are shown with and without the filtering action of the homogenous pixels, the latter is obtained simply by the average of the complex values (module and phase) of the homogenous targets. In FIG. 6b the benefit of the average for the homogenous pixels is shown clearly in terms of the improvement of the signal/noise ratio, which is initially traceable to the clearness of the interferometric fringes compared with the original interferometric fringes. It should be noted that the action of filtering does not lead, where there are sudden variations in local reflectivity, to any significant loss of resolution (blurring effect) that is typical of traditional filtering actions.

The third application of the process according to the invention relates to the estimation of consistency of two SAR images. FIGS. 7a and 7b are compared with what is obtainable with the adaptive process disclosed in the preceding paragraphs and the result of traditional consistency estimation, i.e. by means of a process of a movable average on a 13×25 samples window, i.e. of the same dimensions as the estimation window of the homogenous pixels used in the examples but without any selection of the homogenous pixels; one definition of consistency is disclosed in the article by Touzi, Lopes, Bruniquel, Vachon, "Coherence estimation for SAR imagery" IEEE, Trans. Geosc. Remote Sensing, vol. 37, No. 1, pages 135-149, January 1999. The comparison was made along a cost zone and clearly shows how the typical loss of detail of the traditional technique (FIG. 7a) is not present when the strategy of adaptive selection of the statistically homogenous targets is adopted (FIG. 7b). This confirmation finds an immediate correspondence in the greater clarity of the estimated consistency of the homogenous pixels: the coast line seems better defined, in fact whereas traditional estimation of a movable average does not distinguish between pixels, the estimation on homogenous pixels prevents sea pixels being averaged with earth pixels.

The invention claimed is:

1. A method for identifying statistically homogeneous pixels in images acquired on a same area using a synthetic aperture radar (SAR sensor), the method comprising:

acquiring, using a programmed hardware processing device, a plurality of N radar images (Al...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it; and identifying as statistically homogeneous pixels the pixels that are homogeneous and connected to the sample pixel.

2. The method according to claim 1, wherein every amplitude value of the vector is calculated by means of the equation:

$$A = \sqrt{Re^2 + Im^2}$$

where A is the amplitude value, Re is the real part and Im is the imaginary part of the complex number associated to the pixel.

3. The method according to claim 1, wherein every value of intensity of the vector is calculated by means of the equation:

$$A^2 = Re^2 + Im^2$$

where $A^2$ is the value of amplitude elevated to the square, Re is the real part and Im is the imaginary part of the complex number associated to the pixel.

4. The method according to claim 1, wherein the N images acquired by means of a SAR are acquired at different times.

5. The method according to claim 1, wherein the N images acquired by means of a SAR are acquired with different view angles.

6. The method according to claim 1, wherein the comparison is carried out by means of a Kolmogorov-Smirnov test.

7. A computer comprising a non-transitory memory and a microprocessor configured to exchange data with the memory, the memory comprising a program stored on the memory, which when executed by the microprocessor causes the computer to execute a process for identifying statistically homogeneous pixels of SAR images acquired on a same area, comprising:

acquiring a plurality of N radar images (Al...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it; and identifying as statistically homogeneous pixels the pixels that are homogeneous and connected to the sample pixel.

8. A computer comprising a non-transitory memory and a microprocessor configured to exchange data with the memory, the memory including a program stored on the memory, which when executed by the microprocessor causes the computer to execute a process for identifying statistically homogeneous pixels of SAR images acquired on a same area comprising:

acquiring a plurality of N radar images (Al...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it; and identifying as statistically homogeneous pixels the pixels that are homogeneous and connected to the sample pixel, wherein every amplitude value of the vector is calculated by means of the equation:

$$A=\sqrt{Re^2+Im^2}$$

where A is the amplitude value, Re is the real part and Im is the imaginary part of the complex number associated to the pixel.

9. A computer comprising a non-transitory memory and a microprocessor configured to exchange data with the memory, the memory comprising a program stored on the memory, which when executed by the microprocessor causes the computer to execute a process for identifying statistically homogeneous pixels of SAR images acquired on a same area comprising:

acquiring a plurality of N radar images (A1...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it; and identifying as statistically homogeneous pixels the pixels that are homogeneous and connected to the sample pixel, wherein every value of intensity of the vector is calculated by means of the equation:

$$A^2=Re^2+Im^2$$

where $A^2$ is the value of amplitude elevated to the square, Re is the real part and Im is the imaginary part of the complex number associated to the pixel.

10. A computer comprising a non-transitory memory and a microprocessor configured to exchange data with the memory, the memory comprising a program stored on the memory, which when executed by the microprocessor causes the computer to execute a process for identifying statistically homogeneous pixels of SAR images acquired on a same area comprising:

acquiring a plurality of N radar images (A1...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it and identifying as statistically homogeneous pixels the pixels that are homogeneous and connected to the sample pixel, wherein the N images acquired by means of a SAR are acquired at different times.

11. A computer comprising a non-transitory memory and a microprocessor configured to exchange data with the memory, the memory comprising a program stored on the memory, which when executed by the microprocessor causes the computer to execute a process for identifying statistically homogeneous pixels of SAR images acquired on a same area comprising:

acquiring a plurality of N radar images (A1...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it; and identifying as statistically homogeneous pixels the pixels that are homogeneous and connected to the sample pixel, wherein the N images acquired by means of a SAR are acquired with different view angles.

12. Computer comprising a non-transitory memory and a microprocessor configured to exchange data with the memory, the memory comprising a program stored on the memory, which when executed by the microprocessor causes the computer to execute a process for identifying statistically homogeneous pixels of SAR images acquired on a same area comprising:

acquiring a plurality of N radar images (A1...AN) by using the SAR sensor on the same area with acquisition geometries suitable to allow for a common grid re-sampling of data;

selecting a pixel and identifying it as a sample pixel, after the common grid re-sampling;

calculating a vector of N amplitude or intensity values relative to the sample pixel in N available images and identifying it as a sample vector;

defining an estimation window for the sample pixel to identify a set of pixels around the sample pixel;

calculating the vectors of N amplitude or intensity values for every pixel contained in the estimation window;

comparing, by means of a statistical test, every vector of amplitude or intensity values of the pixels belonging to the estimation window with the sample vector to verify which of the vectors of amplitude or intensity values are generated by the same probability distribution function of the sample vector;

identifying as homogeneous pixels to the sample pixel the pixels associated to the vectors of amplitude or intensity values that have passed the statistical test of the comparing step and identifying as non-homogeneous pixels to the sample pixel those pixels associated to the vectors of amplitude or intensity values that have not passed the statistical test in the comparing step;

eliminating the pixels contained in the estimation window that, even if associated to vectors that have passed the statistical test in the comparing step, are not connected to the sample pixel, directly or by means of other pixels that are homogeneous to it and identifying as statistically homogeneous pixels the pixels that are homogeneous and connected to the sample pixel, wherein the comparison is carried out by means of a Kolmogorov-Smirnov test.

* * * * *